(12) United States Patent
Aitharaju et al.

(10) Patent No.: US 10,144,376 B2
(45) Date of Patent: Dec. 4, 2018

(54) CAP DESIGN FOR FIBER-REINFORCED COMPOSITE CRUSH MEMBERS

(71) Applicant: GM Global Technology Operations LLC, Detroit, MI (US)

(72) Inventors: Venkateshwar R. Aitharaju, Troy, MI (US); Hamid G. Kia, Bloomfield Hills, MI (US); Satvir Aashat, Sterling Heights, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 60 days.

(21) Appl. No.: 15/373,639

(22) Filed: Dec. 9, 2016

(65) Prior Publication Data
US 2018/0162303 A1    Jun. 14, 2018

(51) Int. Cl.
*B60R 19/34*    (2006.01)
*B60R 19/02*    (2006.01)
*B60R 19/03*    (2006.01)

(52) U.S. Cl.
CPC ............ *B60R 19/34* (2013.01); *B60R 19/023* (2013.01); *B60R 19/03* (2013.01)

(58) Field of Classification Search
CPC .......... B60R 19/34; B60R 19/03; B60R 19/22
USPC ............................. 293/132, 133; 296/187.03
See application file for complete search history.

(56) References Cited

U.S. PATENT DOCUMENTS

| 7,357,432 | B2* | 4/2008 | Roll ........................ | B60R 19/18 293/120 |
| 7,819,462 | B1 | 10/2010 | Owens | |
| 8,033,592 | B2 | 10/2011 | Hsu et al. | |
| 8,118,346 | B2* | 2/2012 | Ginja ...................... | B60R 19/34 293/133 |
| 8,419,040 | B2* | 4/2013 | Ando ...................... | B60D 1/04 280/491.5 |
| 8,608,231 | B1* | 12/2013 | Mendivil ................ | B60R 19/34 293/133 |
| 8,641,129 | B2* | 2/2014 | Tyan ...................... | B62D 21/15 296/187.03 |
| 8,757,687 | B2* | 6/2014 | Kaneko ................... | F16F 7/12 188/377 |
| 8,820,805 | B2* | 9/2014 | Lee ......................... | B60R 19/34 188/377 |
| 8,925,679 | B2* | 1/2015 | Vetesnik ............ | A62B 35/0068 182/3 |

(Continued)

FOREIGN PATENT DOCUMENTS

| DE | 19943621 A1 * | 4/2001 | ............ B60R 19/34 |
| DE | 19943622 A1 * | 4/2001 | ............ B60R 19/26 |

(Continued)

*Primary Examiner* — Pinel E Romain
(74) *Attorney, Agent, or Firm* — Harness, Dickey & Pierce, P.L.C.

(57) ABSTRACT

A crush assembly for a vehicle is provided. The crush assembly includes a fiber-reinforced composite crush member and a cap assembly. The cap assembly is disposed on a terminal end of the crush member. The cap assembly includes an outer cap and an inner cap. The outer cap has a first base, a first side wall extending from the first base, and an interior portion formed by the first base and the first side wall. The inner cap includes a second base and a second side wall extending from the second base. The inner cap is nested at least partially within the interior portion.

20 Claims, 8 Drawing Sheets

(56) References Cited

U.S. PATENT DOCUMENTS

| | | | |
|---|---|---|---|
| 9,371,048 B2* | 6/2016 | Farooq | B60R 19/20 |
| 9,403,498 B2* | 8/2016 | Hoschouer | B60R 19/34 |
| 9,834,160 B2* | 12/2017 | Staines | B21D 39/026 |
| 2004/0207217 A1* | 10/2004 | Muller | B60D 1/488 |
| | | | 293/133 |
| 2006/0106147 A1 | 5/2006 | Fasulo et al. | |
| 2006/0199890 A1 | 9/2006 | Fasulo et al. | |
| 2007/0299185 A1 | 12/2007 | Ottaviani et al. | |
| 2010/0098925 A1 | 4/2010 | Fasulo et al. | |
| 2011/0121225 A1 | 5/2011 | Posudievsky et al. | |
| 2017/0305220 A1* | 10/2017 | Virupaksha | B60D 1/56 |

FOREIGN PATENT DOCUMENTS

| | | | | |
|---|---|---|---|---|
| EP | 2335983 A3 * | 1/2012 | | B60R 19/34 |
| FR | 2909618 A1 * | 6/2008 | | B60R 19/34 |

* cited by examiner

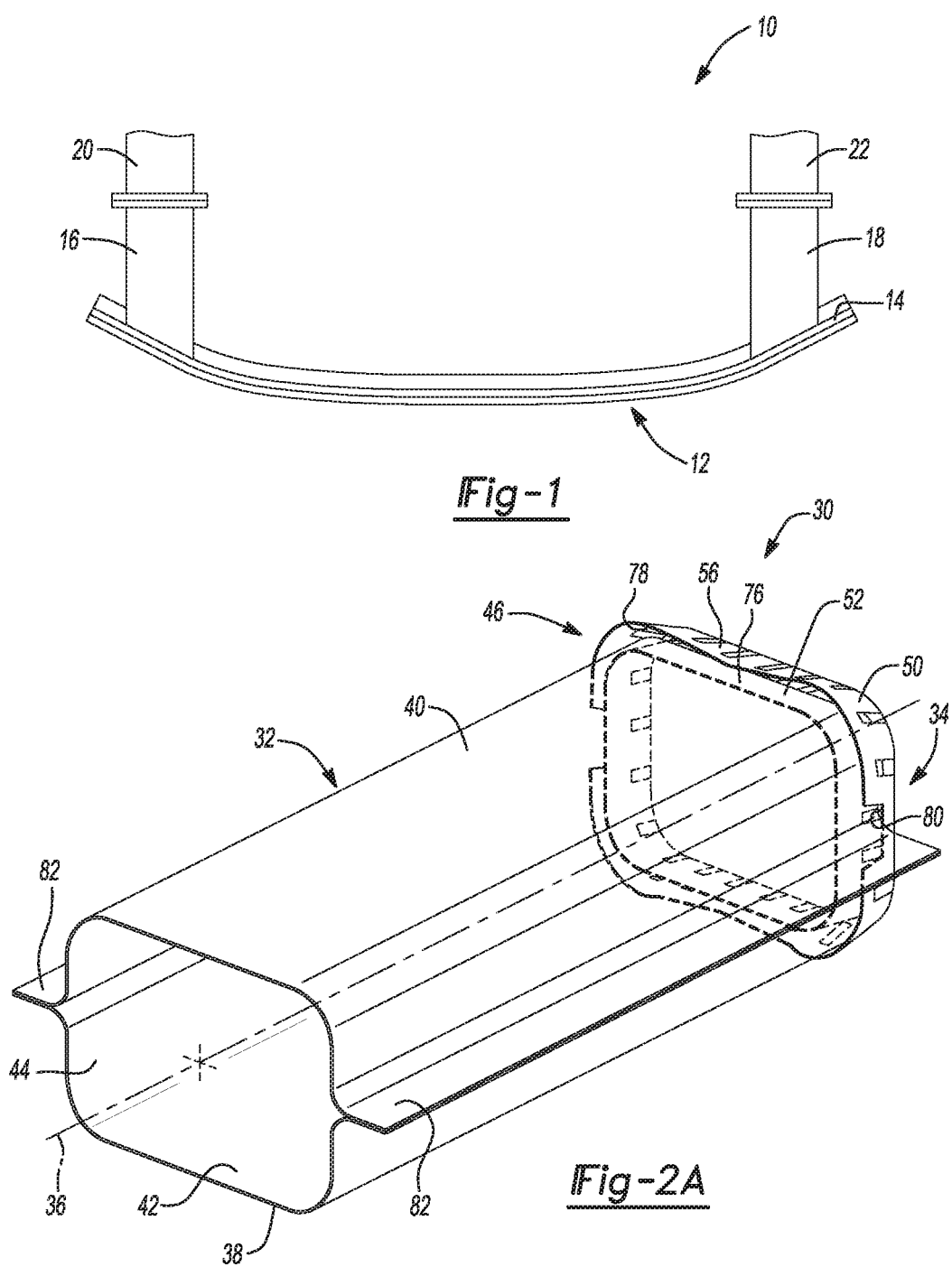

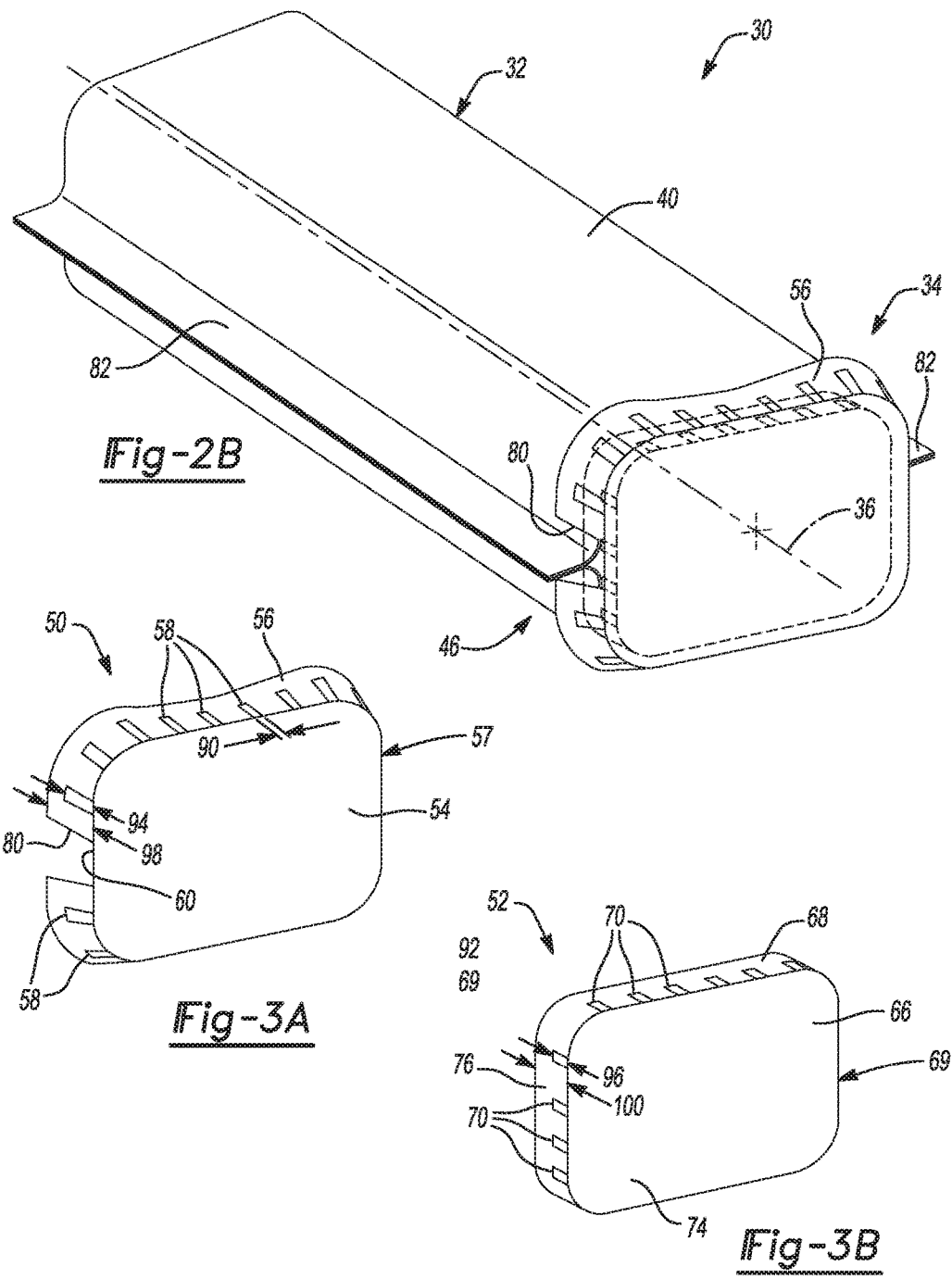

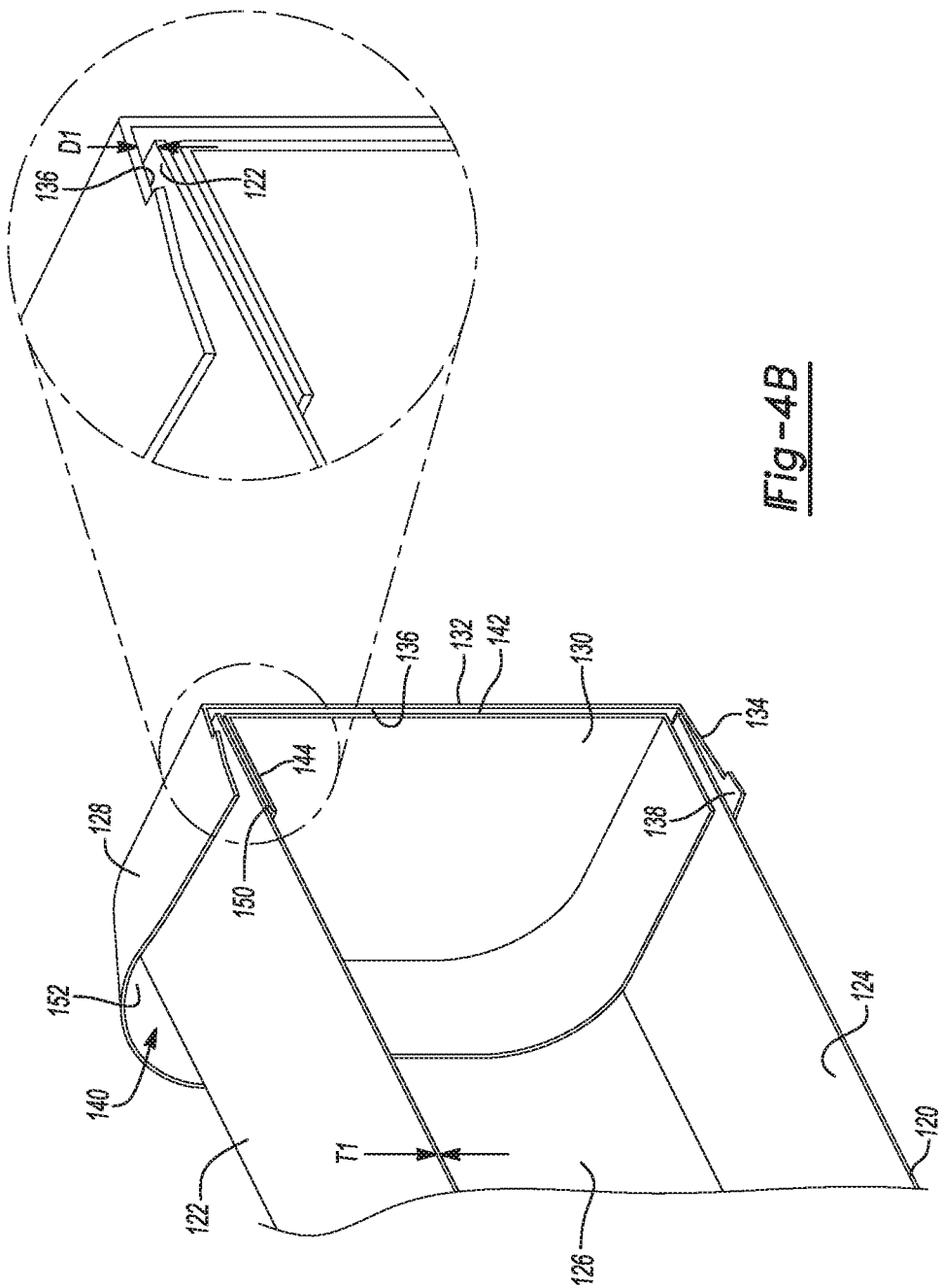

US 10,144,376 B2

CAP DESIGN FOR FIBER-REINFORCED COMPOSITE CRUSH MEMBERS

INTRODUCTION

This section provides background information related to the present disclosure which is not necessarily prior art. The present disclosure relates to a cap design for fiber-reinforced composite members for improved crush performance. Methods of assembling the cap to a bumper assembly are also provided.

It is advantageous to improve crush performance of vehicle components. However, it is also advantageous that components of automobiles or other vehicles be light weight to improve fuel efficiency. Thus, vehicle components that exhibit adequate strength during both normal service and under extraordinary conditions such as collisions, while minimizing component weight are advantageous.

SUMMARY

This section provides a general summary of the disclosure, and is not a comprehensive disclosure of its full scope or all of its features.

In certain aspects, the present disclosure contemplates a crush assembly for a vehicle. The crush assembly includes a fiber-reinforced composite crush member and a cap assembly. The cap assembly is disposed on a terminal end of the crush member. The cap assembly includes an outer cap and an inner cap. The outer cap has a first base, a first side wall extending from the first base, and an interior portion formed by the first base and the first side wall. The inner cap includes a second base and a second side wall extending from the second base. The inner cap is nested at least partially within the interior portion.

In certain variations, at least one of the first side wall and the second side wall includes a plurality of perforations. In other variations, the first side wall includes a first plurality of perforations and the second side wall includes a second plurality of perforations. A first surface area of the first plurality of perforations may be greater than or equal to about 25% and less than or equal to about 35% of a total surface area of the first side wall. A second surface area of the second plurality of perforations may be greater than or equal to about 25% and less than or equal to about 35% of a total surface area of the second side wall.

In certain other variations, the crush member includes a peripheral wall having an inner surface and an outer surface. The inner surface defines a cavity. The second side wall is at least partially disposed within the cavity. The peripheral wall and the first side wall are spaced apart. In some aspects, the terminal end of the crush member and the first side wall define a space having a width. The width is greater than or equal to about one times a thickness of the peripheral wall and less than or equal to about two times the thickness of the peripheral wall. In some aspects, the second side wall and the second base form an angle that is greater than or equal to about ninety degrees.

In still other variations, the crush assembly further includes at least one weld disposed between the first base and the second base.

In some variations, the outer cap is fixed to the terminal end of the crush member. In some aspects, the crush assembly further includes adhesive disposed between an outer surface of the crush member and an inner surface of the outer cap. In other aspects, the crush assembly further includes a plurality of fasteners. Each fastener extends through the outer cap and the terminal end of the crush member.

In other variations, the outer cap includes a flange extending radially from the first base. The flange is configured to engage a bumper of a vehicle. In other aspects, the outer cap is configured to engage a bumper of a vehicle.

In still other variations, the outer cap and the inner cap each include a metal. The metal includes at least one of aluminum or steel.

In other aspects, the present disclosure contemplates a bumper assembly. The bumper assembly includes at least one crush assembly and a bumper. The crush assembly includes a fiber-reinforced composite crush member and a cap assembly. The crush member includes a peripheral wall. The cap assembly includes an outer cap and an inner cap. The inner cap is nested at least partially inside the outer cap. The inner cap is welded to the outer cap. The outer cap is fixed to a terminal end of the crush member. The bumper is fixed to the at least one crush member.

In certain variations, the at least one crush assembly includes a first crush assembly and a second crush assembly. Each of the first and second crush assemblies are fixed to the bumper.

In still other aspects, the present disclosure provides a method of assembling a crush assembly. The method includes providing an outer cap, an inner cap, and a fiber-reinforced composite crush member. The outer cap includes a first base, a first side wall, and an interior portion defined by the first base and the first side wall. The inner cap includes a second base and a second side wall. The crush member includes a peripheral wall, an inner surface, and an outer surface. The method further includes placing the inner cap nested inside the outer cap so that the inner cap is at least partially disposed within the interior portion. The first base is welded to the second base. The outer cap is fixed to a terminal end of the crush member.

In some variations, the second side wall engages the inner surface of the crush member. In some aspects, the method further includes manufacturing the outer cap and the inner cap in a stamping process prior to welding the first base to the second base. In some aspects, fixing includes placing adhesive between the outer cap and the terminal end of the crush member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 shows an exemplary bumper assembly for a vehicle including a crush member;

FIGS. 2A-2B are perspective views of a crush assembly according to certain aspects of the present disclosure;

Figure 3C:
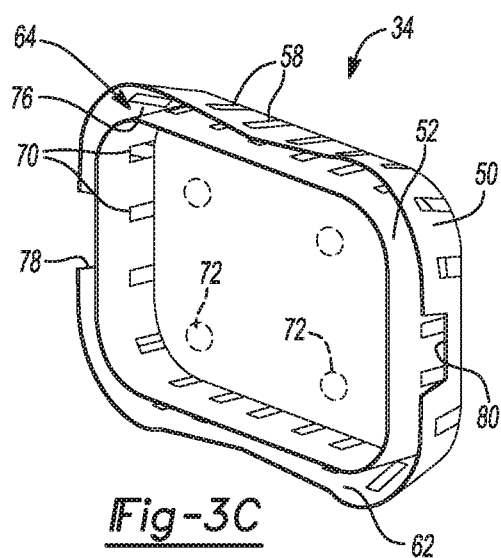
Figure 4A:
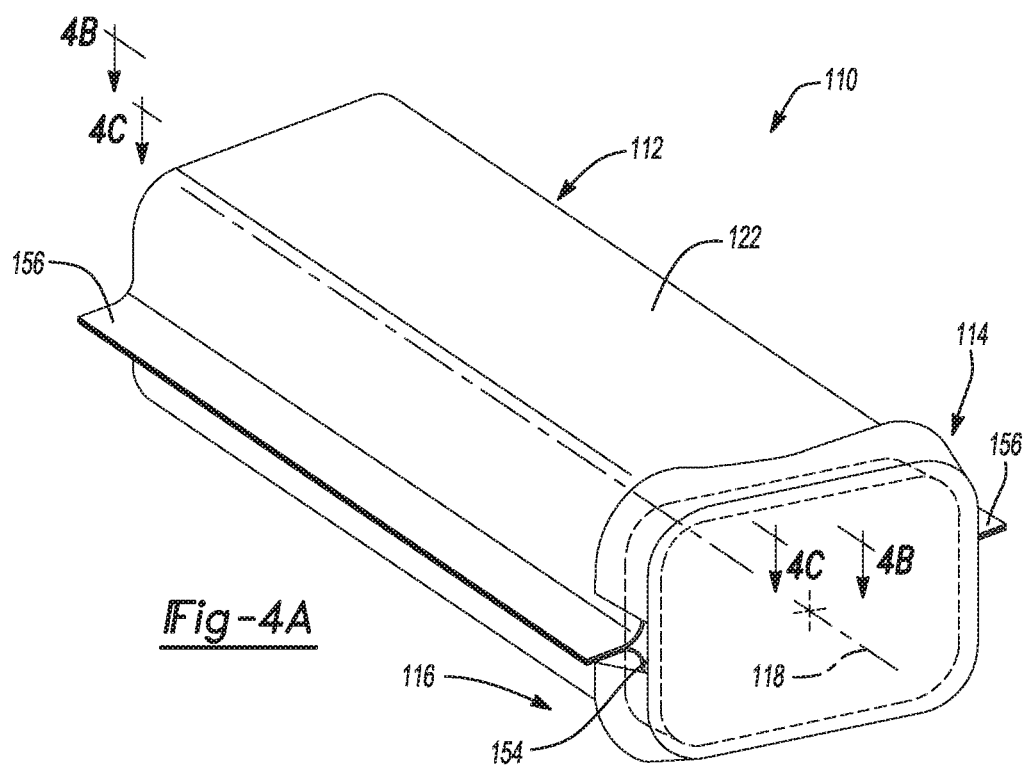
Figure 4C:
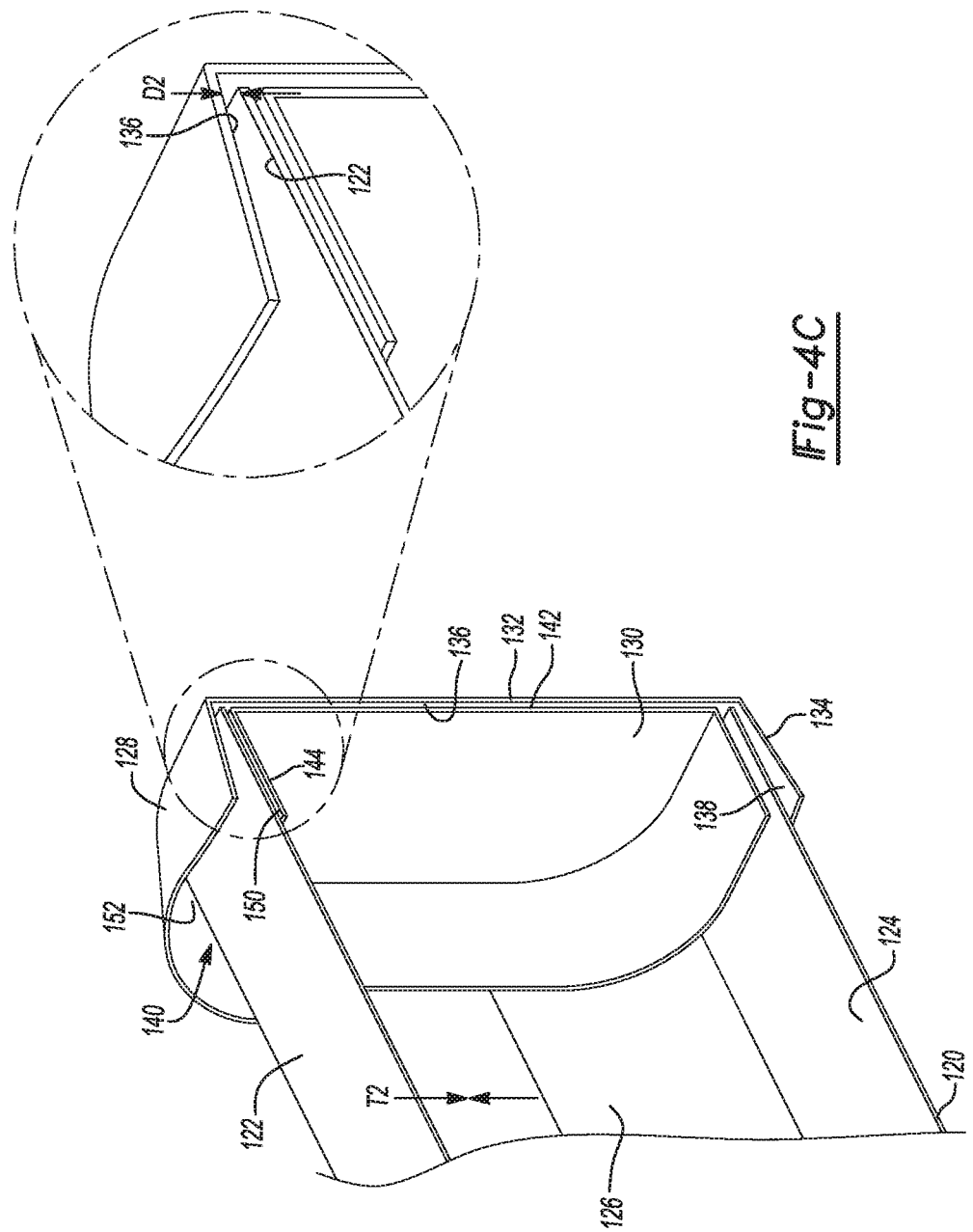
Figure 5A:
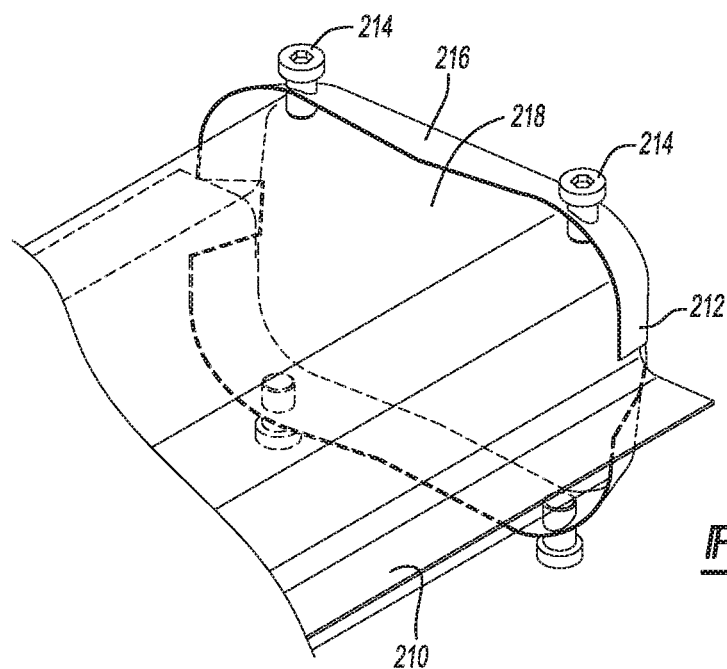
Figure 5B:
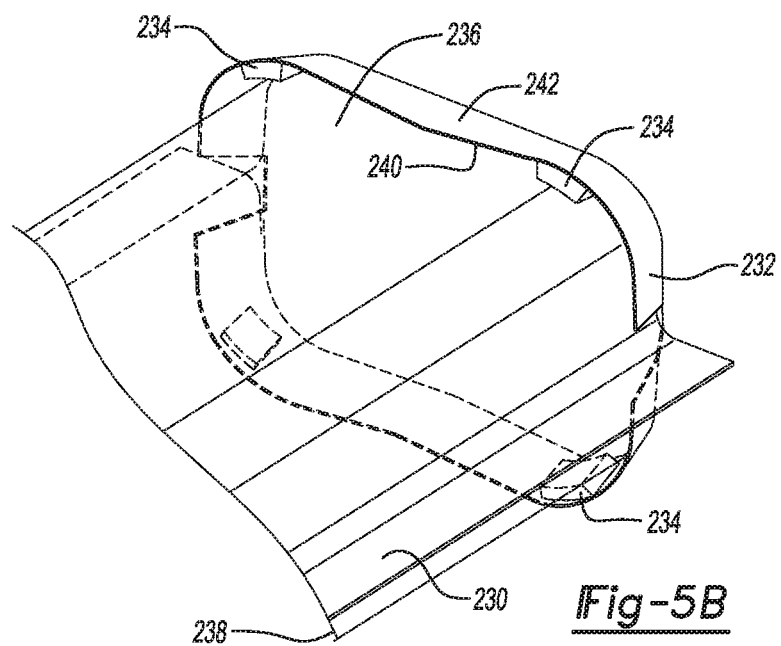
Figure 6A:
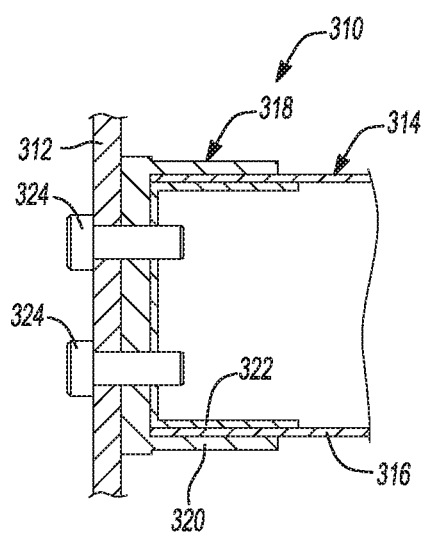
Figure 6B:
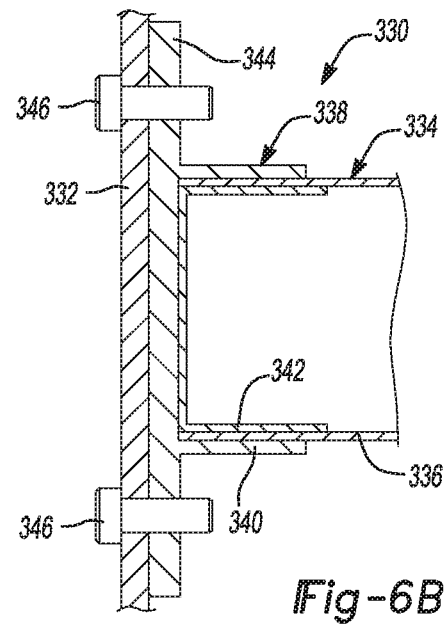
Figure 6C:
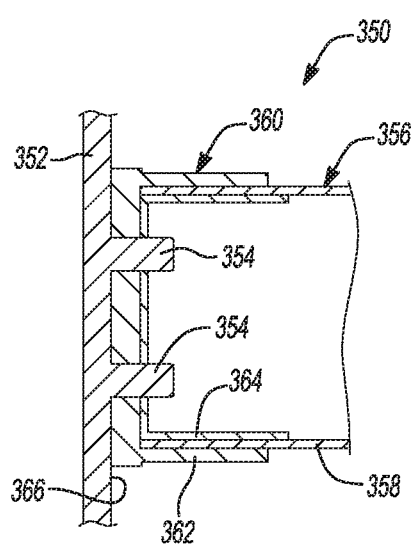
Figure 6D:
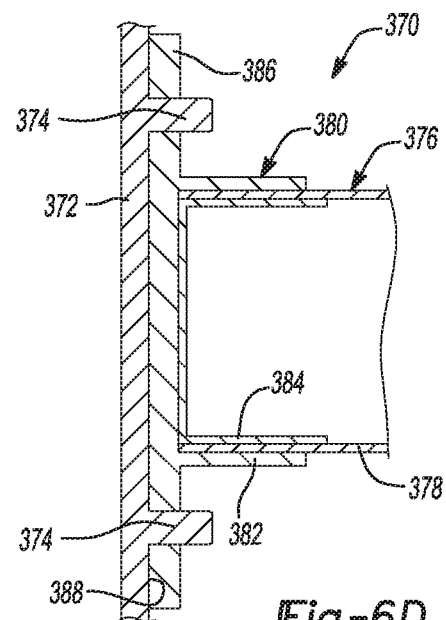
Figure 7A:
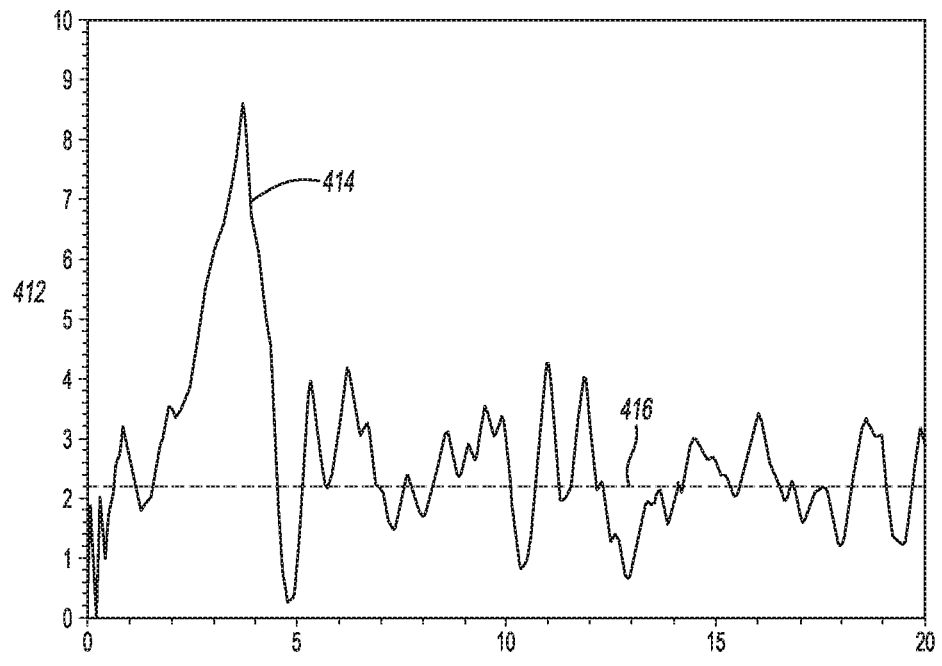
Figure 7B:
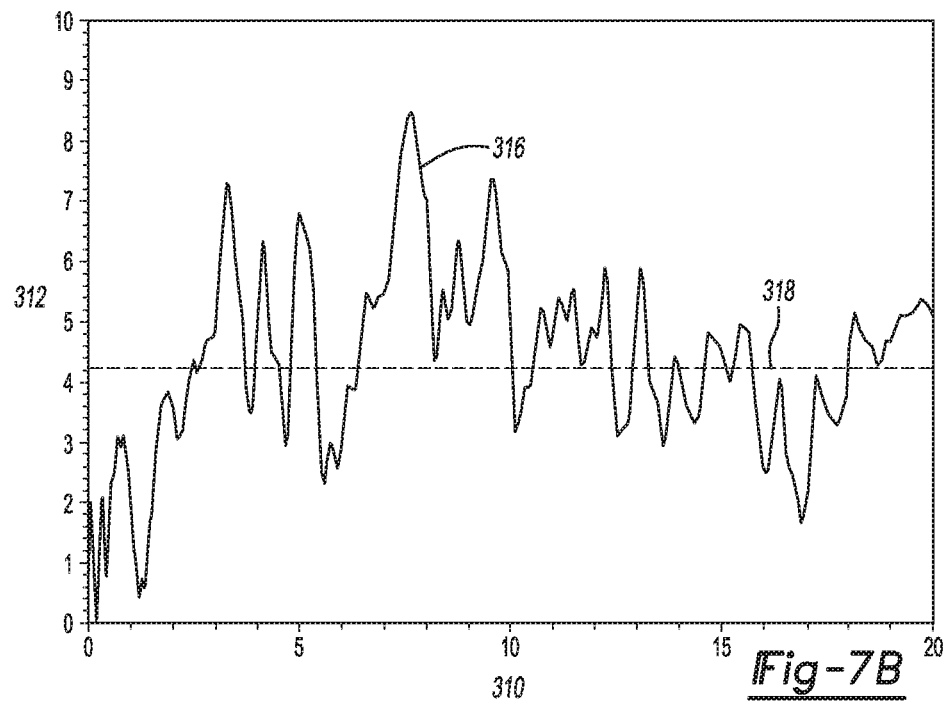

FIGS. 3A-3C are perspective views of inner and outer caps according to certain aspects of the present disclosure. FIG. 3A shows the outer cap. FIG. 3B shows the inner cap. FIG. 3C shows a cap assembly including the outer cap of FIG. 3A and the inner cap of FIG. 3B;

FIGS. 4A-4C show a crush assembly according to certain aspects of the present disclosure. FIG. 4A is a perspective view of a crush assembly. FIG. 4B is a partial perspective section view of the crush assembly of FIG. 4A taken at 4B-4B. FIG. 4C is a partial perspective section view of the crush assembly of FIG. 4A taken at 4C-4C;

FIGS. 5A-5B show exemplary joints between crush members and outer caps according to certain aspects of the present disclosure. FIG. 5A shows an outer cap joined to a crush member with a plurality of screws. FIG. 5B shows an outer cap joined to a crush member with adhesive;

FIGS. 6A-6D show exemplary joints between bumpers and crush assemblies according to certain aspects of the present disclosure. FIG. 6A is a partial cross section showing fasteners extending through a bumper and outer and inner caps of a crush assembly. FIG. 6B is a partial cross section showing fasteners extending through a bumper and a flange on an outer cap of a crush assembly. FIG. 6C is a partial cross section showing a bumper having bosses that extend through an outer cap and an inner cap of a crush assembly. FIG. 6D is a partial cross section showing a bumper having bosses that extend through a flange of an outer cap of a crush assembly;

FIGS. 7A-7B show crush load of composite members over 20 seconds of impact. FIG. 7A shows crush load of a composite member without delamination suppression. FIG. 7B shows crush load of a composite member with delamination suppression.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

Crush assemblies are used in vehicles to absorb collision energy through controlled deformation. Crush assemblies may include crush members, such as crush cans or boxes, attached to a bumper. A crush member may include an outer or peripheral wall extending along a longitudinal axis and a hollow interior. The crush member may also include internal structural geometry for reinforcement. The amount of energy absorbed by a crush member is directly proportional to the volume of material that has been crushed. For example, a crush member having a thick wall has a greater energy absorption potential than a crush member with a thin wall.

Crush members may be constructed from fiber-reinforced composite or metal, such as aluminum or steel. Fiber-reinforced composite materials include a polymeric matrix having a reinforcing material distributed therein. Suitable reinforcing materials include non-crimp fabric ("NCF") carbon or glass fibers, glass fiber, carbon fiber, aramid fiber, basalt fiber, fiber made from natural products such as hemp, jute, or other bast fibers, high strength polymeric fibers, such as high strength polyethylene or high strength polypropylene, by way of non-limiting example. The reinforcing materials may be fabricated as woven fabric, continuous random fabric, chopped random fabric, continuous strand unidirectional plies, oriented chopped strand plies, braided fabric and any combinations thereof. The polymeric matrix may be thermoplastic or thermoset.

Crush members are designed to absorb energy in a crash. Metal crush members absorb energy as molecules slide past one another to deform the component without fracturing. Fiber-reinforced composite crush members absorb energy as individual reinforcing material filaments break one-by-one and the composite is pulverized. However, composite crush members are prone to delamination or separation of layers of material. Delamination results in fronding as layers of material flay away from the body of the crush member and out of the path of impact without breaking the filaments. The loss of intact filaments from the path of impact reduces the amount of energy that a crush member can absorb, thereby decreasing its crush resistance. As a result of delamination, the effective crush stress of a fiber-reinforced composite is much lower than the composite's compressive strength. Delamination is particularly problematic for components having flat geometries.

Fiber-reinforced composite crush members are lighter weight than metal crush members. Such lighter weight crush members may improve vehicle fuel efficiency. However, there is a need for a fiber reinforced crush assembly that exhibits improved crush strength and minimizes or avoids delamination during crush. In various aspects, the present disclosure provides high strength crush assemblies for vehicles, and more specifically, cap assemblies for fiber-reinforced composite crush members. In certain aspects, the present disclosure provides cap assemblies that are configured to be attached to a terminal end of a fiber-reinforced composite crush member to reduce or prevent delamination of the fiber-reinforced composite by retaining the filaments of the composite in the line of impact during crush.

Referring to FIG. 1, an example bumper assembly 10 for a vehicle is provided. The bumper assembly 10 includes a bumper 12 having an energy absorption assembly 14 for distributing force along a predetermined profile. The bumper assembly 10 further includes crush members (e.g., crush cans or boxes) 16 and 18 that respectively connect the bumper 12 to vehicle rails 20 and 22. Each of the vehicle rails 20 and 22 may comprise aluminum or other metals, for example. The bumper assembly 10 may also include other elements such as decorative fascia (not shown).

In certain aspects, the present disclosure provides a crush assembly for a vehicle. Referring to FIGS. 2A-2B, the crush assembly 30 includes a fiber-reinforced composite crush member 32 and a cap assembly 34. The crush member 32 extends along a central longitudinal axis 36 and includes a peripheral wall 38. The peripheral wall 38 includes an outer surface 40 and an inner surface 42 that defines a hollow interior passage 44 or cavity. The crush member 32 may further include internal structural features (not shown) for reinforcement. Structural features may include radially-extending plates, ribs, corrugations, or webs, by way of non-limiting example. The cap assembly 34 is fixed to a terminal end 46 of the crush member 32.

Referring to FIGS. 3A-3C, the cap assembly 34 includes an outer cap 50 and an inner cap 52. As best shown in FIG. 3A, the outer cap 50 includes a substantially planar first base 54 and a first side wall 56 extending around a perimeter 57 of the first base 54. The outer cap 50 may optionally include a flange that extends radially from the first base 54 (not shown here, but shown in FIGS. 6B and 6D and explained in further detail below). The first side wall 56 forms an angle of at least ninety (90) degrees with respect to the first base 54. The angle may be greater than or equal to about ninety (90) degrees and less than or equal to about one hundred thirty-five (135) degrees, optionally about one hundred five degrees (105). The first side wall 56 includes a first plurality of perforations 58. An inner surface 60 of the first base 54 and an inner surface 62 of the first side wall 56 define an interior portion 64 of the outer cap 50.

As best shown in FIG. 3B, the inner cap 52 includes a substantially planar second base 66 and a second side wall 68 extending from a perimeter 69 of the second base 66. The second side wall 68 forms an angle of about ninety (90) degrees with the second base 66. The second side wall 68 includes a second plurality of perforations 70.

Referring to FIG. 3C, the inner cap 52 nests at least partially inside the outer cap 50. That is, the inner cap 52 at least partially occupies the interior portion 64 of the outer cap 50. The inner cap 52 may be configured to complement the outer cap 50. The inner cap 52 is welded to the outer cap 50. A plurality of attachment points, for example, a plurality of welds 72 is disposed between an outer surface 74 of the second base and the inner surface 60 of the first base. As will be appreciated by those of skill in the art, the inner cap 52 and outer cap 50 may be attached by other attachment or connection techniques than welding. The plurality of welds 72 may optionally comprise four welds that are disposed near respective corners of the cap assembly 34.

Returning to FIGS. 2A-2B, an outer surface 76 of the second side wall of the inner cap 52 at least partially engages the inner surface 42 of the peripheral wall 38 of the crush member 32. In this regard, the second side wall 68 acts as a flange to support the crush member 32 at its terminal end 46. The first side wall 56 is disposed around the outer surface 40 of the crush member 32 at its terminal end 46. Thus, the terminal end 46 of the crush member 32 is disposed within a gap 78 between the outer cap 50 and the inner cap 52. The outer cap 50 includes clearance notches 80 to accommodate flanges 82 on the crush member 32. The cap assembly 34 is configured to complement the terminal end 46 of the crush member 32. More specifically, the first base 54 and the second base 66 are similarly shaped when compared to a cross-section of the terminal end 46 of the crush member 32 perpendicular to the central longitudinal axis 36. For example, if the peripheral wall of a crush member includes corrugations, the outer cap and the inner cap must be adapted to complement the corrugations.

During crush, the cap assembly 34 creates a boundary condition to restrict the peripheral wall 38 of the crush member 32 and reduce or prevent delamination. As the fiber-reinforced composite material of the crush member 32 absorbs energy, the filaments break and the composite becomes pulverized. The pulverized composite material can evacuate the crush area through the first and second pluralities of perforations 58, 70. The cap assembly 34 continuously travels with the crush member 32 traversing along the longitudinal axis 36 during crush. The plurality of welds 72 between the outer and inner caps 50, 52 ensure that the boundary condition is maintained to continuously prevent delamination as the crush member 32 as it is pulverized. The outer cap 50 may be sized and shaped to allow a small amount of delamination if the crush member 32 is prone to global buckling.

The first and second pluralities of perforations 58, 70 are configured to accommodate the pulverized composite material during crush. The first and second pluralities of perforations 58, 70 may have a perforation area that can be expressed as a percentage of the total surface area of the first and second side walls 58, 70. The total surface area of a side wall is equal to its surface area if it did not have perforations. Thus, a percentage of the surface area of the plurality of perforations to total surface area is selected to permit an adequate amount of pulverized material to pass through the perforations, while providing adequate structural integrity to the cap assembly. If the percentage is too small, then the pulverized composite will be prevented from adequately escaping the crush area. If the percentage is too large, the first and second side walls 58, 68 will have reduced structural integrity. By way of non-limiting example, the first and second pluralities of perforations 58, 70 may have a total area that is greater than or equal to about 25% and less than or equal to about 35% of the total combined surface area of the first and second side walls 56, 68.

In another example, the perforations have a combined width that can be expressed as a percentage of the perimeter of the perimeter 57 of the first base 54 or the perimeter 69 of the second base 66. The combined width of the perforations is defined as the sum of the individual perforation widths. Thus, the combined perforation width for the first side wall 56 is equal to the individual perforation width 90 multiplied by the number of perforations in the first plurality of perforations 58, and the combined perforation width for the second side wall 68 is equal to the individual perforation width 92 multiplied by the number of perforations in the second plurality of perforations 70. The combined perforation width for each of the first side wall and the second side wall is greater than or equal to about 25% and less than or equal to about 75% of the respective perimeter 57 or 69. Each of the perforations in the first plurality of perforations 58 and the second plurality of perforations 70 may have a height 94 or 96, respectively that is less than the respective side wall height 98 or 100.

The perforations of the first and second pluralities 58, 70 may have geometries that are identical or different. Moreover, distribution of the perforations of the first and second pluralities 58, 70 may be uniform or non-uniform across the first and second walls 56, 68, respectively. Uneven distribution may be useful, for example, when the crush member 32 has a non-uniform thickness so that regions of higher crush member thickness correspond to a higher density of perforations. The first and second pluralities of perforations 58, 70 may be aligned or unaligned.

In other variations, a cap assembly for a fiber-reinforced composite crush member may include either a first plurality of perforations or a second plurality of perforations. The perforations are configured to accommodate pulverized composite during crush. Thus, a cap assembly having perforations on only one of the outer cap or the inner cap may require larger or more perforations when compared to a crush assembly having both first and second pluralities of perforations. It should be noted that in alternative variations, the perforations may have different shapes, spacing, and placement than the examples shown.

In other variations, the present disclosure provides another crush assembly 110 as shown in FIGS. 4A-4C. The crush assembly 110 includes a fiber-reinforced crush member 112 and a cap assembly 114 disposed on a terminal end 116 of the crush member 112. The crush member 112 extends along a central longitudinal axis 118 and includes a peripheral wall 120. The peripheral wall 120 includes an outer surface 122 and an inner surface 124 including a hollow interior passage 126 or cavity.

The cap assembly 114 includes an outer cap 128 and an inner cap 130. The outer cap 128 includes a substantially planar first base 132 and a first side wall 134 extending around a perimeter of the first base 132. The first side wall 134 forms an angle of at least ninety degrees with respect to the first base 132. The angle may be greater than or equal to about ninety (90) degrees and less than or equal to about one hundred thirty-five (135) degrees, optionally about one hundred five (105) degrees. An inner surface 136 of the first base and an inner surface 138 of the first side wall define an interior portion 140 of the outer cap 128.

The inner cap 130 includes a substantially planar second base 142 and a second side wall 144 extending from a perimeter of the second base 142. The second side wall 144 forms an angle of about ninety (90) degrees with the second base 142.

The inner cap 130 nests at least partially inside the outer cap 128. More specifically, the inner cap 130 at least partially occupies the interior portion 140 of the outer cap 128. The inner cap 130 may be configured to complement the outer cap 130. The inner cap 130 is welded to the outer cap 128 in a similar manner as that described with respect to the plurality of welds 72 of cap assembly 34 in FIGS. 3A-3C.

With continued reference to FIGS. 4A-4C, an outer surface 150 of the second side wall of the inner cap 130 at least partially engages the inner surface 124 of the peripheral wall 120 of the crush member 112 to act as a flange to support the terminal end 116 of the crush member 112. The first side wall 134 is disposed around the outer surface 122 of the crush member 112 at its terminal end 116. Thus, the terminal end 116 of the crush member 112 is disposed within a gap 152 between the outer cap 128 and the inner cap 130. The outer cap 128 includes clearance notches 154 to accommodate flanges 156 on the crush member 112. The cap assembly 114 is configured to complement the terminal end 116 of the crush member 112. More specifically, the first base 132 and the second base 142 are similarly shaped when compared to a cross-section of the terminal end 116 of the crush member 112 perpendicular to the central longitudinal axis 118.

The outer surface 122 of the crush member 112 is spaced apart from the inner surface 136 of the first side wall 134 so that pulverized composite material can evacuate the crush area during crush. The distance between the outer cap 128 and the crush member 112 is designed to minimize delamination while providing sufficient clearance for pulverized composite during crush. For example, when the distance is zero, delamination may be completed suppressed but pulverized composite cannot be adequately removed. In contrast, when the distance is greater than about two times the thickness of the peripheral wall 120 of the crush member 112, pulverized composite can escape, but delamination and fronding of the composite may occur. Thus, the distance between the crush member 112 and the outer cap 128 at the terminal end 116 of the crush member 112 should be greater than or equal to about one times the peripheral wall 120 thickness and less than or equal to about two times the peripheral wall 120 thickness.

The peripheral wall 120 of the crush member 112 may have a uniform thickness or a variable thickness. By way of non-limiting example, the thickness of the peripheral wall 120 is greater than or equal to 2 mm and less than or equal to 4 mm. A crush member 112 having a peripheral wall 120 with non-uniform thickness may have corners that are thicker than sides to provide strategic higher strength areas. When the peripheral wall 120 of the crush member 112 has a variable thickness, the distance between the outer surface 122 of the peripheral wall 120 and the inner surface 136 of the first side 134 should be similarly variable. That is, a thicker peripheral wall requires a greater distance to evacuate pulverized composite when compared to a thinner peripheral wall. Referring to FIG. 4B, the peripheral wall 120 has a first thickness T1 along a middle portion. The outer surface 122 of the peripheral wall 120 of the crush member 112 is spaced apart from the inner surface 136 of the side wall 134 of the outer cap 128 a first distance D1 or width at a middle portion of the terminal end 116 of the crush member 112. Referring now to FIG. 4C, the peripheral wall 120 has a second thickness T2 near a corner. The second thickness T2 is greater than the first thickness T1. Thus, a second distance D2 or width between the outer surface 122 of the peripheral wall 120 of the crush member 112 and the inner surface 136 of the first side wall 134 of the outer cap 128 is greater than the first distance D1 at a corner of the terminal end 116 of the crush member 112.

During crush, the cap assembly 114 creates a boundary condition to restrict the peripheral wall 120 of the crush member 112 and reduce or prevent delamination. As the fiber-reinforced composite of the crush member 112 absorbs energy, the filaments break and the composite becomes pulverized. The pulverized composite material evacuates the crush area through the space between the crush member and the outer cap. The cap assembly 114 continuously travels with the crush member 112 during crush. The plurality of welds between the outer and inner caps 128, 130 ensure that the boundary condition is maintained to continuously prevent delamination as the crush member 112 is pulverized. The outer cap 128 may be sized and shaped to allow a small amount of delamination if the crush member 112 is prone to global buckling. A small amount of delamination can be allowed by increasing the distance between the peripheral wall 120 and the outer cap 128.

In still other variations, the present disclosure provides a crush assembly having a cap assembly that includes both perforations, like those shown in FIGS. 2A-3C, and a spaced apart crush member and outer cap, as shown in FIGS. 4A-4C. The above features are configured to accommodate the pulverized composite during crush. Thus, a crush assembly having both of the above features may include smaller perforations, a smaller distance between the crush member and the outer cap, or both. As noted above, in alternative variations, the perforations may have different shapes, spacing, and placement than the examples shown.

A cap assembly according to the present disclosure may be constructed from metal. The metal may include steel or aluminum, by way of non-limiting example. In other examples, the cap assembly may comprise a polymer. Suitable polymers include glass or carbon fiber-filled polyamide, polyarylaminde, polyesters, and epoxies.

In other aspects, the present disclosure provides components for assembling a crush member to an outer cap. The components may be used in any of the crush assemblies described above. With reference to FIG. 5A, a crush member 210 is assembled to an outer cap 212 with a plurality of fasteners 214. More specifically, each fastener 214 of the plurality extends through a side wall 216 of the outer cap 212 and a peripheral wall 218 of the crush member 210. In one variation, the plurality of fasteners 214 may comprise four fasteners, each of which may be disposed in a respective corner.

Referring now to FIG. 5B, a crush member 230 is assembled to an outer cap 232 with a plurality of adhesive patches 234. More specifically, the plurality of adhesive patches 234 is disposed between an outer surface 236 of a peripheral wall 238 of the crush member 230 and an inner surface 240 of a side wall 242 of the outer cap 232. In one variation, the plurality of adhesive patches 234 may comprise four adhesive patches, each of which may be disposed in a respective corner. Suitable adhesives include polyurethane, epoxy, or acrylic adhesives.

Fixing the outer cap to the crush member, as described above and shown in FIGS. 5A-5B, enables the cap assembly to move continuously with the crush member during crush. Thus, the filaments of the composite are retained in the line of impact for the duration of crush for increased energy absorption.

In still other aspects, the present disclosure provides bumper assemblies including crush assemblies. The bumper assemblies may include any of the crush assemblies described above. Referring to FIG. 6A, a bumper assembly 310 is provided. The bumper assembly 310 includes a bumper 312. The bumper may be formed from a metal such as aluminum, by way of non-limiting example. The bumper assembly 310 further includes a crush assembly 314 having a crush member 316 and a cap assembly 318. The cap assembly 318 includes an outer cap 320 and an inner cap 322. The crush assembly 314 is attached to the bumper 312 by a plurality of fasteners 324 extending through the bumper 312, the outer cap 320, and the inner cap 322.

With reference to FIG. 6B, another example of a bumper assembly 330 is provided. The bumper assembly 330 includes a bumper 332 that may be constructed from a metal such as aluminum, by way of non-limiting example. The bumper assembly 330 further includes a crush assembly 334 having a crush member 336 and a cap assembly 338. The cap assembly 338 includes an outer cap 340 and an inner cap 342. The outer cap 340 includes a flange 344. The crush assembly 334 is attached to the bumper 330 by a plurality of fasteners 346 extending through the bumper 332 and the flange 344 of the outer cap 340.

Referring now to FIG. 6C, still another example of a bumper assembly 350 is provided. The bumper assembly 350 includes a bumper 352. The bumper 352 may be constructed from a fiber-reinforced composite and may include a plurality of integrally-formed bosses 354. Alternatively, the bumper 352 may include a plurality of embedded bolts (not shown) instead of the plurality of integrally-formed bosses 354. The bumper assembly 350 further includes a crush assembly 356 having a crush member 358 and a cap assembly 360. The cap assembly 360 includes an outer cap 362 and an inner cap 364. The plurality of integrally-formed bosses 354 extend from a contact surface 366 of the bumper 352 and through the outer cap 362 and the inner cap 364. Retention bolts (not shown) can engage the bosses 354 to secure the crush assembly 356 to the bumper 352.

With reference to FIG. 6D, still another example of a bumper assembly 370 is provided. The bumper assembly 370 includes a bumper 372. The bumper 372 may be constructed from a fiber-reinforced composite and may include a plurality of integrally-formed bosses 374. Alternatively, the bumper 372 may include a plurality of embedded bolts (not shown) instead of the plurality of integrally-formed bosses 374. The bumper assembly 370 further includes a crush assembly 376 having a crush member 378 and a cap assembly 380. The cap assembly 380 includes an outer cap 382 and an inner cap 384. The outer cap 382 includes a flange 386. The plurality of integrally-formed bosses 374 extend from a contact surface 388 of the bumper 372 and through the flange 386 of the outer cap 382. Retention bolts (not shown) can engage the bosses 374 to secure the crush assembly 376 to the bumper 372.

Fixing the crush assembly to the bumper, as described above and in FIGS. 6A-6D, enables the crush assembly to remain attached to the back of the bumper during impact to a bumper. The above assembly is particularly useful in the case of off-axis loads. Off-axis loads are loads that impact the bumper at an angle other than ninety (90) degrees. Absent adequate attachment between the bumper and the crush assembly, the crush assembly may be sheared away from the bumper and rendered unable to absorb energy as intended. The assemblies of FIGS. 6A-6D reduce the occurrence of shear between the bumper and the crush assembly during impact.

In still other aspects, the present disclosure provides a method of assembling a bumper assembly having a crush assembly including a fiber-reinforced composite crush member. The method includes providing an outer cap, an inner cap, and a fiber-reinforced crush member. The outer cap includes first base, a first side wall, and an interior portion defined by the first base and the first side wall. The inner cap includes a second base and a second side wall. The fiber-reinforced composite crush member includes a peripheral wall, an inner surface, and an outer surface. The method further includes placing the inner cap nested inside the outer cap so that the inner cap is at least partially disposed within the interior portion.

The method includes welding the first base of the outer cap to the second base of the inner cap to form a cap assembly. Welding may include forming a plurality of spot welds. The plurality of spot welds may include three or four spot welds, by way of non-limiting example. The spot welds may be disposed near respective corners of the first base and the second base.

The method further includes fixing the outer cap to a terminal end of the crush member. Fixing may include placing adhesive between the outer cap and the terminal end of the peripheral wall of the crush member. In other examples, fixing may include inserting a plurality of fasteners through the outer cap and the terminal end of the crush member.

Prior to welding, the inner cap and the outer cap may be manufactured in a stamping process or by die casting, as non-limiting examples. In some examples, the inner cap and the outer cap are made from a metal such as aluminum or steel.

The crush assembly may be subsequently fixed to the back of a bumper of a vehicle. In some examples, multiple crush assemblies are fixed to a bumper. For example, a bumper assembly may include two crush assemblies, each crush assembly disposed between a back of a bumper and a respective vehicle rail.

Various embodiments of the inventive technology can be further understood by the specific examples contained herein. Specific Examples are provided for illustrative purposes of how to make and use the compositions, devices, and methods according to the present teachings and, unless explicitly stated otherwise, are not intended to be a representation that given embodiments of this invention have, or have not, been made or tested.

Example 1

Fiber-reinforced composite samples are crushed without and with delamination suppression. Samples having delamination suppression exhibit a higher average crush load than samples without delamination suppression.

Composite Crush Without Delamination Suppression

A crush fixture is configured to secure a flat sample between two opposing sample guides including anti-buckling supports. A first fiber-reinforced composite sample is placed in the crush fixture between the opposing sample guides. A first end of the sample engages a crush plate. A second end of the first sample is configured to be crushed by an impactor. Opposing first and second sides of the first sample adjacent the first end are unsupported. The crush fixture with the first sample is placed under a DYNATUP™ high speed, servo-hydraulic test machine that is capable of velocities up to 4 meters/second. The first sample is crushed over a time period of 20 seconds.

Referring to FIG. 7A, time in seconds is shown on the x-axis 410 and load in kN is shown on the y-axis at 412. Load as a function of time is shown at 414. The average crush load over 20 seconds is shown at 416. The average crush load 416 for a first fiber-reinforced composite sample crushed without delamination suppression is 2.2 kN.

Composite Crush with Delamination Suppression

A second fiber-reinforced composite sample is placed in the crush fixture between opposing sample guides. A first end of the second sample is engages a crush plate. A second end of the second sample is configured to be crushed by the impactor. Opposing sides of the second sample adjacent the first end are supported by pins that extend from the crush plate. Two pins are disposed on one side of the second sample near respective edges of the sample and one pin is disposed on the opposing side of the second sample near the center of the sample.

Referring to FIG. 7B, time in seconds is shown on the x-axis at 430 and load in kN is shown on the y-axis at 432. Load as a function of time is shown at 434. The average crush load over 20 seconds is shown at 436. The average crush load for a second fiber-reinforced composite sample crushed with delamination suppression is 4.2 kN.

Crush assemblies as described above are particularly suitable for use in components of an automobile or other vehicle (e.g., motorcycles, boats), but may also be used in a variety of other industries and applications, including aerospace components, industrial equipment and machinery, farm equipment, and heavy machinery, by way of non-limiting example. While reference will be made herein to automotive bumper assemblies, it should be noted that although the cap assemblies provided by the present disclosure are particularly well-suited for such applications, they may also be used for other composite energy absorption components.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A crush assembly for a vehicle, the crush assembly comprising:
   a fiber-reinforced composite crush member; and
   a cap assembly disposed on a terminal end of the crush member, the cap assembly comprising:
   an outer cap having a first base, a first side wall extending from the first base, the first base and the first side wall defining an interior portion; and
   an inner cap having a second base and a second side wall extending from the second base, the inner cap nested at least partially within the interior portion, wherein:
   the first base and the second base are shaped to complement the terminal wall at the terminal end of the crush member; and
   the inner cap and outer cap are configured to limit delamination of the fiber-reinforced composite crush member during impact.

2. The crush assembly of claim 1, wherein at least one of the first side wall and the second side wall includes a plurality of perforations.

3. The crush assembly of claim 2, wherein the first side wall includes a first plurality of perforations and the second side wall includes a second plurality of perforations.

4. The crush assembly of claim 3, wherein a first surface area of the first plurality of perforations is greater than or equal to about 25% and less than or equal to about 35% of a total surface area of the first side wall and a second surface area of the second plurality of perforations is greater than or equal to about 25% and less than or equal to about 35% of a total surface area of the second side wall.

5. The crush assembly of claim 1, the crush member comprising a peripheral wall having an inner surface and an outer surface, the inner surface defining a cavity, wherein:
   the second side wall is at least partially disposed within the cavity; and
   the peripheral wall and the first side wall are spaced apart.

6. The crush assembly of claim 5, wherein the terminal end of the crush member and the first side wall define a space having a width greater than or equal to about one times a thickness of the peripheral wall and less than or equal to about two times the thickness of the peripheral wall.

7. The crush assembly of claim 5, wherein the second side wall and the second base form an angle that is greater than about ninety degrees.

8. The crush assembly of claim 1, further comprising at least one weld disposed between the first base and the second base.

9. The crush assembly of claim 1, wherein the outer cap is fixed to the terminal end of the crush member.

10. The crush assembly of claim 9, further comprising adhesive disposed between an outer surface of the crush member and an inner surface of the outer cap.

11. The crush assembly of claim 1, wherein the outer cap is configured to engage a bumper of the vehicle.

12. The crush assembly of claim 1, wherein the outer cap and the inner cap each comprise a metal comprising at least one of aluminum or steel.

13. A crush assembly for a vehicle, the crush assembly comprising:
    a fiber-reinforced composite crush member; and
    a cap assembly disposed on a terminal end of the crush member, the cap assembly comprising:
    an outer cap having a first base, a first side wall extending from the first base, wherein the first base and the first side wall define an interior portion;
    an inner cap having a second base and a second side wall extending from the second base, the inner cap nested at least partially within the interior portion; and
    a plurality of fasteners, each fastener extending through the outer cap and the terminal end of the crush member.

14. The crush assembly of claim 13, wherein at least one of the first side wall and the second side wall includes a plurality of perforations.

15. The crush assembly of claim 13, wherein the first side wall includes a first plurality of perforations and the second side wall includes a second plurality of perforations.

16. The crush assembly of claim 13, wherein a first surface area of the first plurality of perforations is greater than or equal to about 25% and less than or equal to about 35% of a total surface area of the first side wall and a second surface area of the second plurality of perforations is greater than or equal to about 25% and less than or equal to about 35% of a total surface area of the second side wall.

17. A crush assembly for a vehicle, the crush assembly comprising:
    a fiber-reinforced composite crush member;
    a cap assembly disposed on a terminal end of the crush member, the cap assembly comprising:
    an outer cap having a first base, a first side wall extending from the first base, and a flange extending radially from the first base, the first base and the first side wall defining an interior portion; and
    an inner cap having a second base and a second side wall extending from the second base, the inner cap nested at least partially within the interior portion, wherein the flange is configured to engage a bumper of the vehicle.

18. The crush assembly of claim 17, further comprising at least one weld disposed between the first base and the second base.

19. The crush assembly of claim 17, wherein the outer cap and the inner cap each comprise a metal comprising at least one of aluminum or steel.

20. The crush assembly of claim 17, wherein the first side wall includes a first plurality of perforations and the second side wall includes a second plurality of perforations.

* * * * *